(12) United States Patent
Ozaki

(10) Patent No.: US 7,817,144 B2
(45) Date of Patent: Oct. 19, 2010

(54) INFORMATION INPUT DISPLAY APPARATUS, INFORMATION PROCESSING METHOD AND COMPUTER PROGRAM

(75) Inventor: Koji Ozaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 825 days.

(21) Appl. No.: 11/498,105

(22) Filed: Aug. 3, 2006

(65) Prior Publication Data

US 2007/0030250 A1 Feb. 8, 2007

(30) Foreign Application Priority Data

Aug. 5, 2005 (JP) ............................ P2005-227517

(51) Int. Cl.
*G06F 3/041* (2006.01)
(52) U.S. Cl. ........................ 345/173; 345/172; 345/169; 345/156
(58) Field of Classification Search .................. 345/173, 345/169, 172
See application file for complete search history.

(56) References Cited

U.S. PATENT DOCUMENTS

| | | | | |
|---|---|---|---|---|
| 4,263,659 A | * | 4/1981 | Hirata et al. ................. | 708/138 |
| 5,270,710 A | * | 12/1993 | Gaultier et al. ................ | 341/33 |
| 6,067,074 A | * | 5/2000 | Lueders ....................... | 345/156 |
| 6,639,165 B1 | * | 10/2003 | Newman et al. .......... | 200/83 Y |
| 2003/0048260 A1 | * | 3/2003 | Matusis ....................... | 345/173 |
| 2004/0217939 A1 | * | 11/2004 | Levy et al. ................... | 345/156 |

FOREIGN PATENT DOCUMENTS

| | | |
|---|---|---|
| JP | S59-131990 | 7/1984 |
| JP | 4-47456 | 2/1992 |
| JP | 2004-45644 | 2/2004 |

* cited by examiner

*Primary Examiner*—Richard Hjerpe
*Assistant Examiner*—Andrew Schnirel
(74) *Attorney, Agent, or Firm*—Finnegan, Henderson, Farabow, Garrett and Dunner, L.L.P.

(57) ABSTRACT

An information input display apparatus is provided. The apparatus includes: an information display unit formed with a flexible material; an information input unit provided at a back of the information display unit and including keys onto which input of data is performed with a pressing-down process involving a deformation of the information display unit; and a control unit adapted to perform control processing of display information supplied to the information display unit, and key setting processing such that a key of the information input unit at a position corresponding to a data input portion contained in the display information is set as an information input key corresponding to the displayed data input portion.

11 Claims, 9 Drawing Sheets

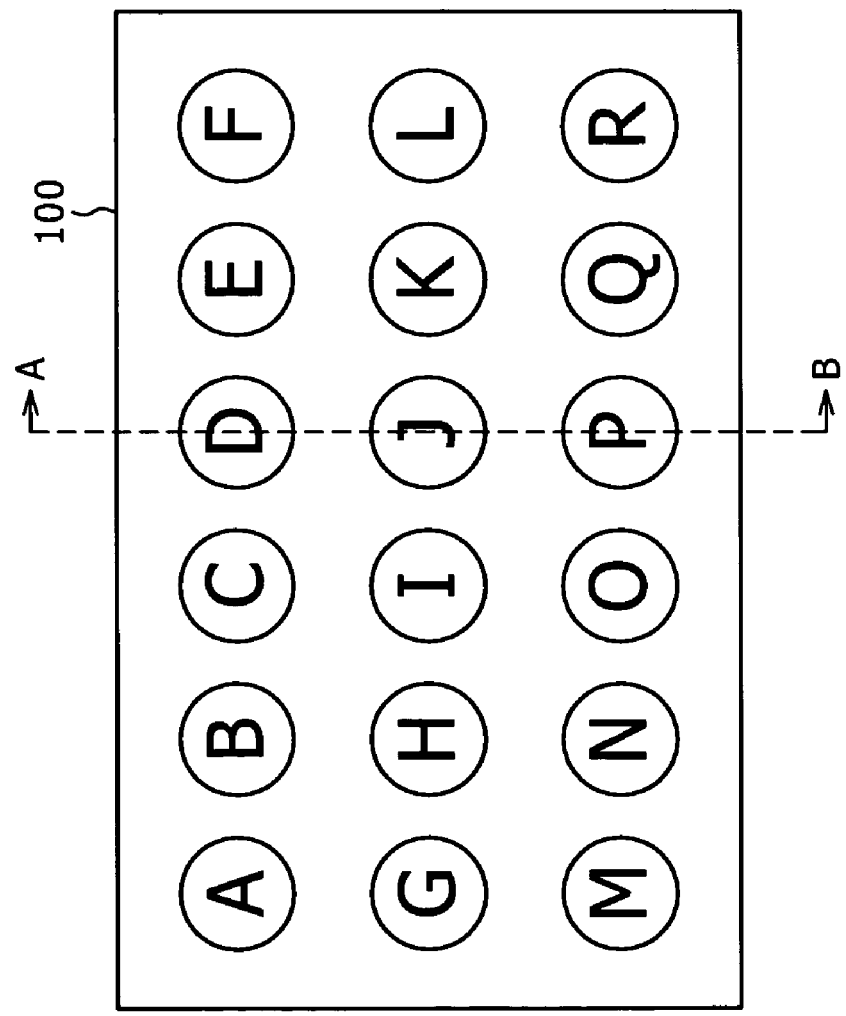
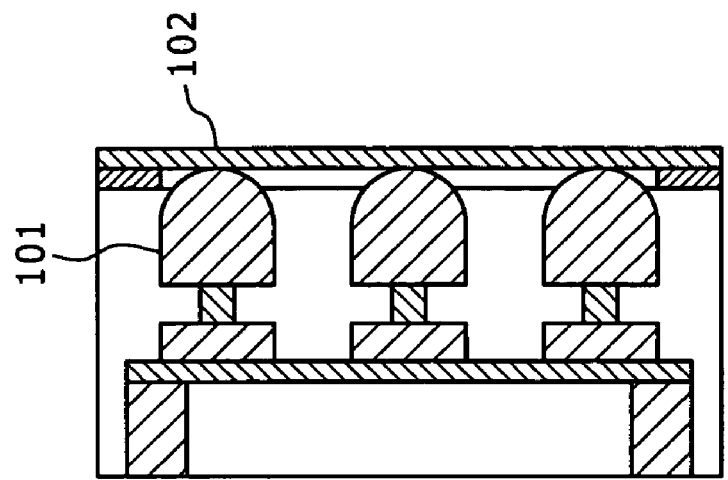
FIG. 1A
FIG. 1B

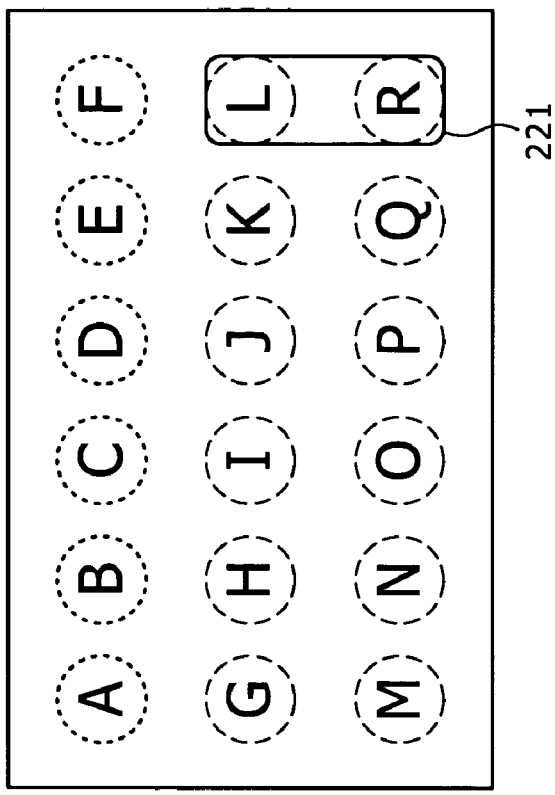
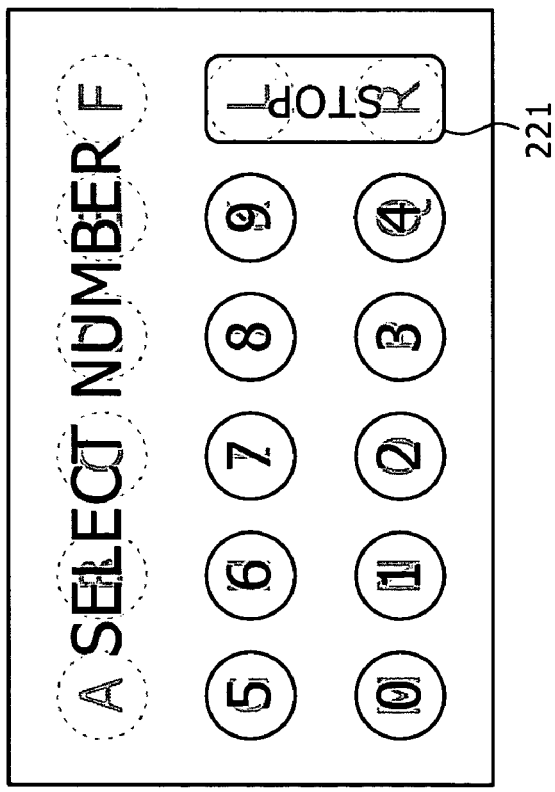
FIG. 5A
FIG. 5B

INFORMATION INPUT DISPLAY APPARATUS, INFORMATION PROCESSING METHOD AND COMPUTER PROGRAM

BACKGROUND OF THE INVENTION

1. Field of the Invention

The present invention relates to an information input and display apparatus, an information processing method, and a computer program. More specifically, the present invention relates to an information input and display apparatus (below, referred to as information input/display apparatus), an information processing method and a computer program that are all adaptable to realize both of input of information capable of improving ease of user's operation and display of information capable of enhancing visibility.

2. Description of the Related Arts

An information input/display apparatus having both of an information input unit and an information display unit has been used as one of user interfaces in various types of information processing apparatuses. Use of the information input display apparatus providing both of a data display function and a data input function is required for an operating unit etc. of an apparatus such as a bank terminal, a ticket machine, a copying machine and a facsimile apparatus, in addition to an electronic apparatus such as a digital camera, a display apparatus and an image recording/reproducing apparatus, for instance.

SUMMARY OF THE INVENTION

As one example of the information input/display apparatus of this type, there is an apparatus including a liquid crystal display apparatus with a touch panel functionality to be used as an input unit. However, the information input display apparatus of this type is adapted to detect input of information when a user touch a hard panel. Accordingly, some erroneous input may happen even when user's cloth has just touched the touch panel screen. Further, this information input/display apparatus uses the touch with a user's finger to perform the input of information. Such an input operation may not provide a user with much sense of actual operation, and the user may not be able to feel that the input of information is completed. Japanese Patent Application Publication JP S59-131990 discloses an example of such technologies of the information input/display apparatus of the type adapted for both of information display and information input.

Further, in the information input/display apparatus, in a case of a configuration having both of the information input unit and the information display unit needs to display information input keys and display information in arrangement on a limited display area, and is thus forced to take a measure of reducing a display information size and/or a key size, resulting in an issue such that the user may also find difficulty in viewing and operating the display information and the information input keys.

Accordingly, it is desirable to provide, in a configuration having both an information input unit and an information display unit, an information input/display apparatus, an information processing method and a computer program that are all adaptable to realize input of information capable of improving ease of user's operation and/or display of information capable of enhancing visibility. The present invention has been undertaken in view of the above issues.

In one embodiment of the present invention, there is provided an information input/display apparatus. The apparatus includes: an information display unit formed with a flexible material; an information input unit provided at a back of the information display unit and including keys onto which input of data is performed with a pressing-down process involving a deformation of the information display unit; and a control unit adapted to perform control processing of display information supplied to the information display unit, and key setting processing such that a key of the information input unit at a position corresponding to a data input portion contained in the display information is set as an information input key corresponding to the displayed data input portion.

In one embodiment of the present invention, there is provided the information input/display apparatus configured such that the information input unit includes a key matrix including more than one information input key, and the control unit is configured to set plural keys of the information input unit, which is disposed at a position corresponding to a data input portion contained in the display information of the information display unit, as an information input keys corresponding to the displayed data input portion.

In one embodiment of the present invention, there is provided the information input/display apparatus configured such that the information input unit includes a key matrix including more than one information input key, and the control unit is configured to set plural keys of the information input unit, which is disposed at a position corresponding to a data input portion contained in the display information of the information display unit, as an information input keys corresponding to the displayed data input portion, and execute a process to invalidate one or more keys not corresponding to the data input portion.

In one embodiment of the present invention, there is provided the information input/display apparatus configured such that the information display unit is configured to allow display of the display information requiring no power supply, and the control unit is configured to perform display processing for displaying display information requiring no power supply if the power is turned off.

In one embodiment of the present invention, there is provided the information input/display apparatus configured such that the control unit is configured to perform display processing for displaying display information indicating a power-on switch as the display information requiring no power supply if the power is turned off.

In one embodiment of the present invention, there is provided the information input/display apparatus configured such that the control unit is configured to perform processing for changing a display mode of the data input portion if pressing-down of a key is detected, the key being included in the information input unit and disposed at the position corresponding to the displayed data input portion on the information display unit.

In one embodiment of the present invention, an information processing method is provided. The method includes: performing display control processing of display information supplied to an information display unit, the information display unit and an information input unit being stacked on one another and forming an information input/display apparatus, the information input unit including keys for data input, the keys being formed on the back of the information display unit; performing key setting processing such that a key of the information input unit at a position corresponding to a data input portion contained in the display information is set as an information input key corresponding to the displayed data input portion; and performing operation detection processing for detecting input of information, the input being performed by pressing one of the information input keys with deformation of the information display unit.

In one embodiment of the present invention, there is provided the information processing method configured such that the information input unit includes a key matrix including more than one information input key; and the key setting processing sets plural keys of the information input unit, which is disposed at a position corresponding to a data input portion contained in the display information of the information display unit, as an information input keys corresponding to the displayed data input portion.

In one embodiment of the present invention, there is provided the information processing method configured such that the information input unit includes a key matrix including more than one information input key; and the key setting processing sets plural keys of the information input unit, which is disposed at a position corresponding to a data input portion contained in the display information of the information display unit, as an information input keys corresponding to the displayed data input portion, and execute a process to invalidate one or more keys not corresponding to the data input portion.

In one embodiment of the present invention, there is provided the information processing method configured such that the information display unit is configured to allow display of the display information requiring no power supply; and the information processing method further performs display processing for displaying display information requiring no power supply if the power is turned off.

In one embodiment of the present invention, there is provided the information processing method configured such that the information processing method further includes performing of display processing for displaying display information indicating a power-on switch as the display information requiring no power supply if the power is turned off.

In one embodiment of the present invention, there is provided the information processing apparatus configured such that the information processing method further includes performing of processing for changing a display mode of the data input portion if pressing-down of a key is detected, the key being included in the information input unit and disposed at the position corresponding to the displayed data input portion on the information display unit.

In one embodiment of the present invention, there is provided a computer program adapted to perform, on a computer, processing applicable to an information input display unit. The computer program includes: performing display control processing of display information supplied to an information display unit, the information display unit and an information input unit being stacked on one another and forming the information input display unit, the information input unit including keys for data input, the keys being formed on the back of the information display unit; performing key setting processing such that a key of the information input unit at a position corresponding to a data input portion contained in the display information is set as an information input key corresponding to the displayed data input portion; and performing operation detection processing for detecting input of information, the input being performed by pressing one of the information input keys with deformation of the information display unit.

It should be noted that the computer program of the present invention is specified as a computer program adaptable to be provided, for a general-purpose computer system allowing various types of program codes to run, through a storage medium or a communication medium provided in a computer readable form, or a storage medium such as a CD, a FD and a MO or a communication medium such as a network. Use of the above type of computer program provided in the computer readable form permits the processing suited to the program to be implemented on the computer system.

It should also be noted that the system referred to in the present specification is specified as more than one logical aggregate of apparatuses, and is not limited to a system of a type requiring that the apparatuses in each logical aggregate be installed in the same casing.

According to an embodiment of the present invention, there is provided an information input display apparatus including: an information display unit formed with a flexible material; an information input unit provided at a back of the information display unit and including keys onto which input of data is performed with a pressing-down process involving a deformation of the information display unit; and a control unit adapted to perform control processing of display information supplied to the information display unit, and key setting processing such that a key of the information input unit at a position corresponding to a data input portion contained in the display information is set as an information input key corresponding to the displayed data input portion.

Accordingly, the information input display apparatus according to the present embodiment enables a user to make the input of data by pressing-down action that involves deformation of the information display unit, thereby allowing the user to confirm, along with a sense of higher operability, that the input of data is completed.

Further, the information input display apparatus of the present embodiment enables to prevent the user from performing incorrect information input operation as much as possible by selecting only valid keys, which are keys to be used in the current operation mode, depending on content of the information display unit, and making those keys available for information input while setting the other keys as invalid keys.

Furthermore, the embodiments of the present invention are capable of improving ease of operation and visibility through effective use of a limited display area without taking any measure to reduce a displayed character size and the like.

BRIEF DESCRIPTION OF THE DRAWINGS

The features and advantages of the present invention will become more apparent in the following description of embodiments of the invention taken in conjunction with the accompanying drawings, in which:

FIG. 1 illustrates one configuration of an information input/display apparatus according to one embodiment of the present invention;

FIG. 5 illustrates another example of display on the information input/display apparatus according to one embodiment of the present invention, together with an example of utilizing the another example of display;

DETAILED DESCRIPTION OF THE EMBODIMENTS

An information input display apparatus, an information processing method and a computer program according to the present invention are now described in detail with reference to the accompanying drawings.

One configuration and processing of the information input display apparatus (referred to as information input/display apparatus below) in an embodiment of the present invention are described with reference to FIG. 1. FIG. 1 illustrates an information input/display apparatus 100 in the present embodiment. In FIG. 1, FIG. 1(a) is a front plan view of an information input display unit, and FIG. 1(b) is a sectional view (a section taken on line A-B in FIG. 1(a)) of the information input display unit.

The information input/display apparatus 100 in FIG. 1(a) provides display of information input keys [A to R] as they are as one of information display forms. However, information input key display data is subject to change depending on operation modes. Such processing will be described later. As shown in the sectional view of FIG. 1(b), the information input/display apparatus 100 is configured in form of a device provided with an information display unit 102 in front of information input keys 101.

Figure 2A:
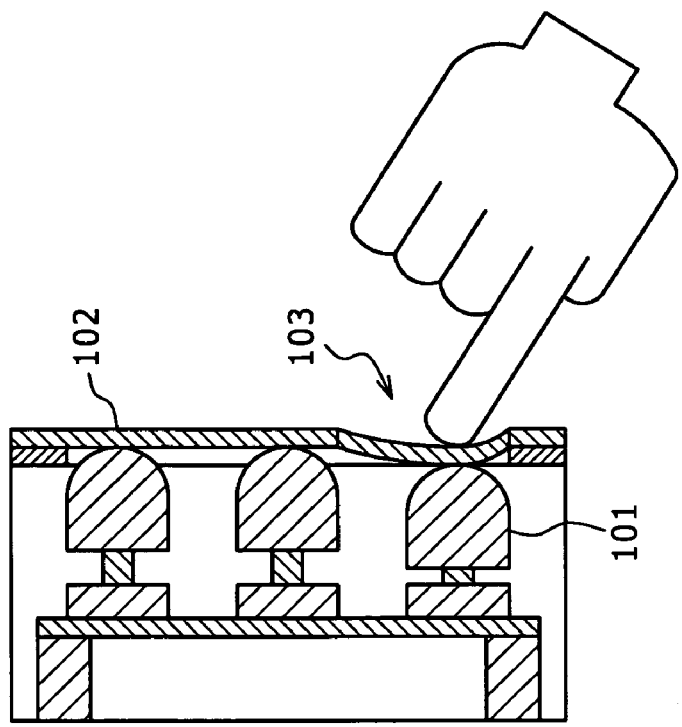
FIG. 2 illustrates one manner of using the information input/display apparatus according to one embodiment of the present invention.
Figure 2B:
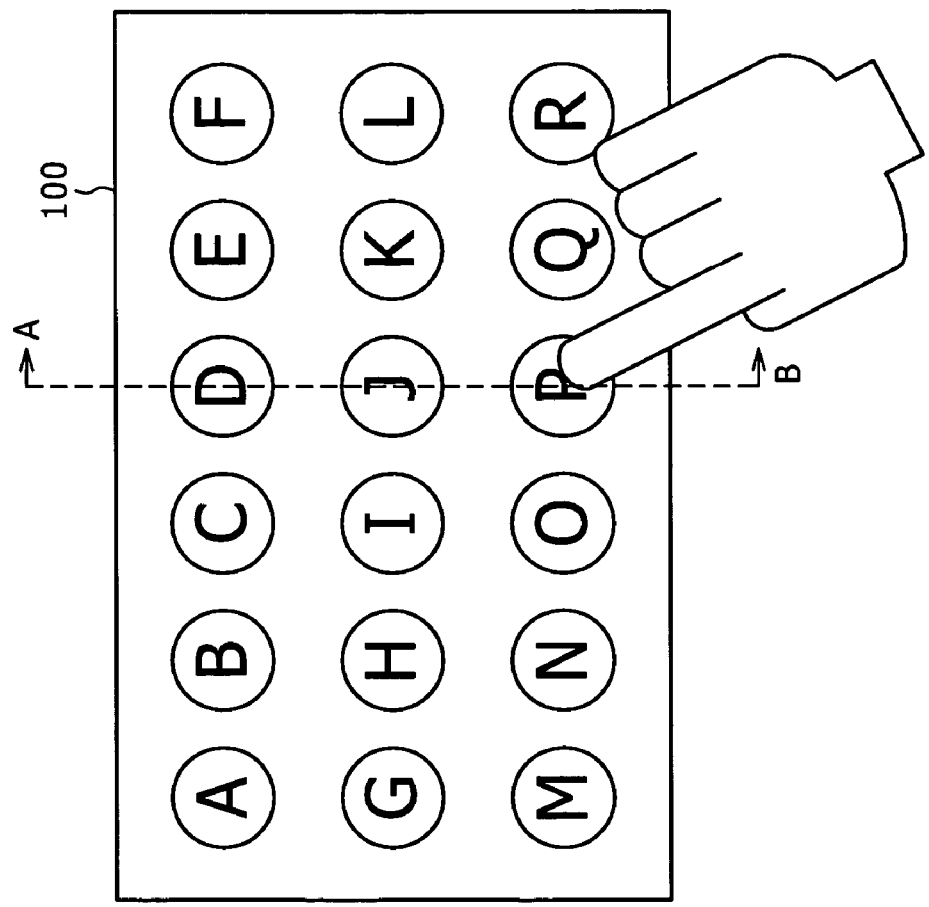

An example of operating the information input keys 101 is described with reference to FIG. 2. Like FIG. 1, FIG. 2 also includes FIG. 2(a) that is a front plan view of the information input display unit, and FIG. 2(b) that is a sectional view (a section taken on line A-B in FIG. 2(a)) of the information input display unit. In FIG. 2, there is shown the information input display unit in a mode where a user presses an information input key 101 down. As shown in the sectional view of FIG. 2(b), the information input/display apparatus 100 takes a structure allowing a deformation of the information display unit 102 when the user makes input of information by pressing down any information input key 101. As shown in FIG. 2(b), a contact pressure given by contacting with a user's finger causes the information display unit 102 at a top of the pressed information input key 101 to be changed into a concave-shaped deformed portion 103.

When making the input of information through the information input keys 101, the user applies the contact pressure to the target information input key 101 at a back of the information display unit 102 by pushing in the information display unit 102 formed with a flexible material. The information input keys 101 are preferably necessary to be provided in form of keys that may be displaced or deformed through an operation of a switch such as a mechanical switch and a membrane switch, for instance.

When the user operates the information input keys 101 in the above manner, the information input/display apparatus 100 causes the user to make such a deformation processing action as to change the information display unit 102 at the top of the pressed information input key 101 into the concave-shaped deformed portion 103. Accordingly, the user engaged in operating the information input/display apparatus 100 is allowed to obtain a sense of operability with assurance that the pressing-down is surely performed on the target information input key 101 and that the input of information is surely performed.

In a case of an input unit of related art involving use of a hard panel, the user finds difficulty in confirming whether or not the input of information is completed through the touch. On the other hand, according to the configuration of the present embodiment, the information display unit 102 is subject to the deformation, causing the pressed information input key 101 to be displaced or deformed, permitting the user to confirm by the touch whether or not the input of information is completed. The information input keys 101 are preferably necessary to take a switch configuration based on the mechanical switch or the membrane switch etc. as described the above, or a switch configuration providing a certain degree of displacement or deformation through the pressing-down given by the user.

The information display unit 102 is formed with the flexible material adaptable to be deformed by the contact pressure given by the contact with the user. The information display unit 102 is available in form of an organic EL display, an inorganic EL display or an electrophoresis-type electronic paper etc. that has been progressively developed in recent years. It should be noted that a technology on the electrophoresis-type electronic paper is described in Japanese Patent Application Publication 2004-45644, for instance. In the present embodiment, it does not matter whether or not a display on the information display unit 102 is provided in a color or monochromatic display.

Display information on the information display unit 102 is subject to change depending on a mode of use of the display information. Further, setting of input information assigned to each of the information input keys 101 also changes depending on the mode of use of the information input keys.

An example of change in the display of the information display unit 102 and an example of change in the setting of the information input keys 101 are described with reference to infra FIG. 3.

Figure 3A:
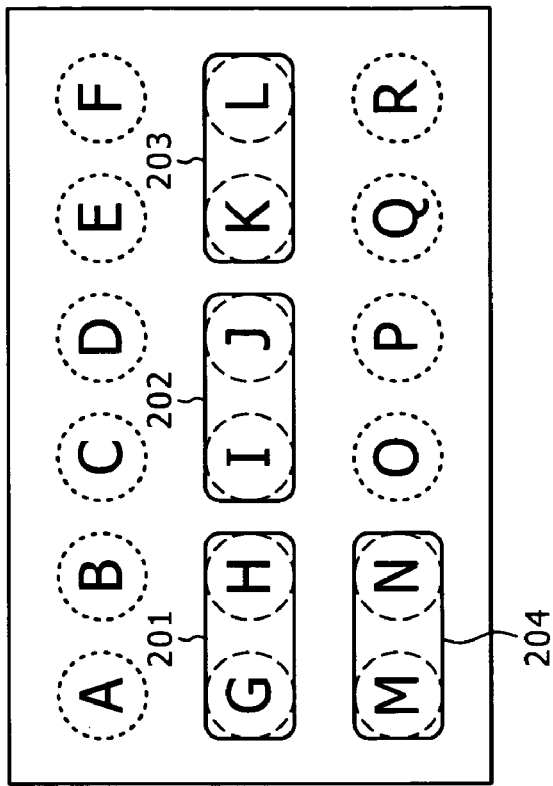
FIG. 3 illustrates one example of display on the information input/display apparatus according to one embodiment of the present invention, together with an example of utilizing the example of display.

FIG. 3(a) illustrates an example of display. The illustrated example of display provides one information display adapted to permit the user to select one item out of four choices, "Sepia", "Monochromatic", "Plain" and "Unchanged". In this information display, each display area of four input portions, a "Sepia" input portion 201, a "Monochromatic" input portion 202, a "Plain" input portion 203 and an "Unchanged" input portion 204, is given as an area having a correspondence with two information input keys.

Figure 3B:
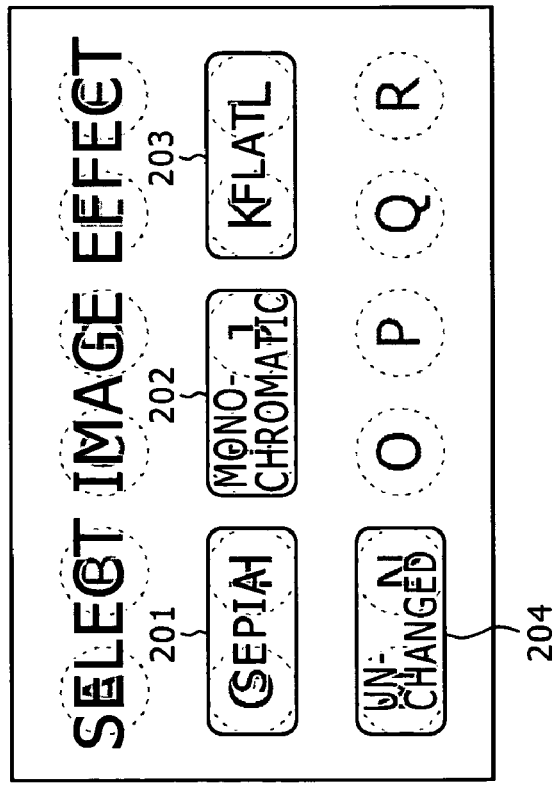

FIG. 3(b) is a view showing the information input keys corresponding to the display areas of the four input portions, the "Sepia" input portion 201, the "Monochromatic" input portion 202, the "Plain" input portion 203, and the "Unchanged" input portion 204. To illustrate relationships between the display areas and the information input keys, these display areas are shown without any displayed characters.

As shown in FIG. 3(b), key assignment is made as follow. The information input keys [G] and [H] are assigned to the "Sepia" input portion 201, those [I] and [J] are assigned to the "Monochromatic" input portion 202, those [K] and [L] are assigned to the "Plain" input portion 203, and those [M] and [N] are assigned to the "Unchanged" input portion 204.

When operating the "Sepia" input portion 201, for instance, pressing down of either the information input key [G] or [H] causes information of "Sepia" to be inputted as selected information. When operating other input portions, pressing down of either one assigned key or the other also causes input of selected information to be performed. The information input keys A to F and O to R having no correspondence with any input portions are set as invalid keys ensuring that pressing down of any of these keys causes no input of information.

As described the above, the information input display apparatus of the present embodiment enables effective use of a limited display area by changing the setting of the information input keys according to the change of display contents on the information display unit, permitting improvement of operability, together with enhancement of visibility, to be attained without taking any measure of reducing a displayed character size and the like.

Some display forms and key settings different from those shown in FIG. 3 are described with reference to FIGS. 4 and 5. An illustrated example of display in FIG. 4(a) provides one information display adapted to permit the user to select an image size, specifically, one item out of two choices, "640× 480" and "1280×960". In this information display, the setting of the information input keys is given such that four information input keys are respectively set to correspond with each display area of two input portions, a "640×480" input portion 211 and a "1280×960" input portion 212.

Figure 4B:
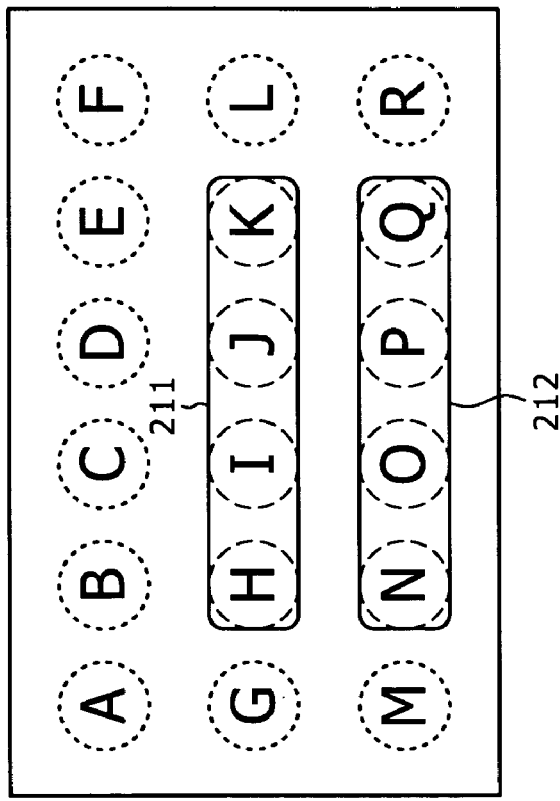
FIG. 4 illustrates another example of display on the information input/display apparatus according to one embodiment of the present invention, together with an example of utilizing the another example of display.
Figure 4A:
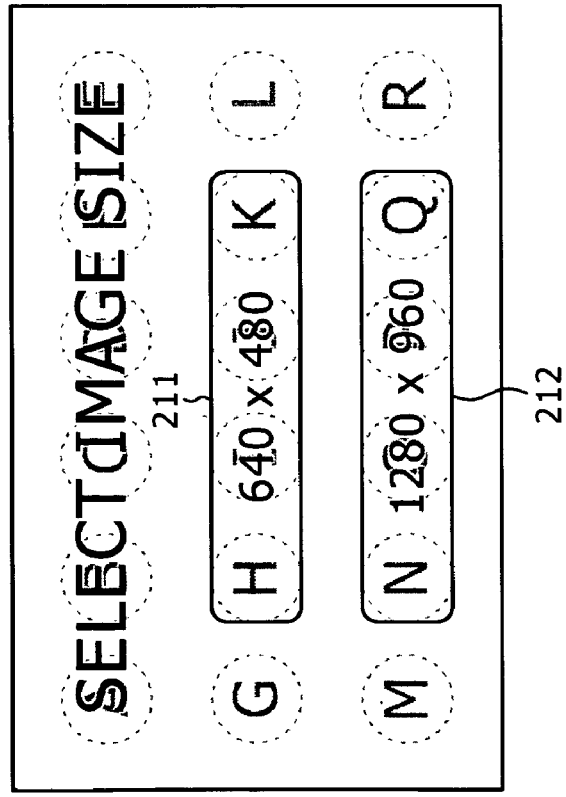

FIG. 4(b) is a view showing the information input keys corresponding to the display areas of the two input portions, the "640×480" input portion 211 and the "1280×960" input portion 212. To illustrate the relationship between the display area and the information input key, these display areas are shown without any displayed character.

As shown in FIG. 4(b), the key assignment is made, specifically, the information input keys [H], [I], [J] and [K] are assigned to the "640×480" input portion 211, and those [N], [O], [P] and [Q] are assigned to the "1280×960" input portion 212.

When operating the "640×480" input portion 211, for instance, pressing down of any of the information input keys [H], [I], [J] and [K] causes information of "640×480" to be inputted as the selected information. When operating the other input portions, pressing down of any of four assigned keys also causes the input of selected information to be performed. The information input keys A to F and G, L, M and R having no correspondence with any input portion are set as invalid keys, thereby ensuring that the pressing down of any of these keys causes no input of information.

An illustrated example of display in FIG. 5(a) provides one information display adapted to permit the user to select any of numbers ranging from 0 to 9. In this information display example, ten input portions adapted for selection of the numbers ranging from 0 to 9 and a "Stop" input portion 221 are set. Thus, the setting of the information input keys is given such that the ten information input keys are individually set to have one-to-one correspondence with the ten input portions adapted for selection of the numbers ranging from 0 to 9, while the two information input keys are set to correspond with the "Stop" input portion 221.

FIG. 5(b) is a view showing the information input keys corresponding to the display areas of the ten input portions adapted for selection of the numbers ranging from 0 to 9 and the "Stop" input portion 221. To illustrate the relationship between the display area and the information input key, these display areas are shown without any displayed characters.

As shown in FIG. 5(b), the key assignment is made as follow. The information input keys [G] to [K] and [M] to [Q] are assigned to the ten input portions adapted for selection of the numbers ranging from 0 to 9. The information input keys [L] and [R] are assigned to the "Stop" input portion 221.

As described the above, the information input display apparatus according to the present embodiment permits the information input key setting to be changed into various forms according to the change of the display content on the information display unit, thereby preventing a user from making an error when information is input as much as possible. In the present embodiment, the user is allowed to select only the valid keys, which are available for selection in the current operation. Each of the valid keys is set to a corresponding information input value depending on the display content on the information display unit. The other keys are set as the invalid keys. Accordingly, the information input/display apparatus according to the present embodiment is capable of improving ease of operation and visibility through effective use of a limited display area without taking any measure to reduce a displayed character size and the like.

As one embodiment involving use of the information input/display apparatus of the present embodiment, one application of this information input/display apparatus to a digital camera is described with reference to FIG. 6. FIGS. 6(a) to (d) all show a back face of the digital camera, wherein the back face of the digital camera has an information input display unit having the above configuration.

Figure 6B:
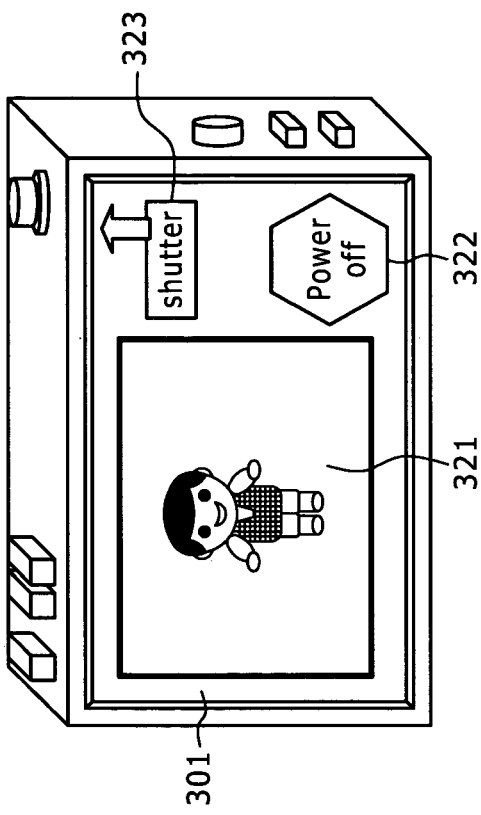
FIG. 6 illustrates another example of display in a case of applying the information input/display apparatus according to one embodiment of the present invention to a digital camera, together with an example of utilizing the another example of display.
Figure 6D:
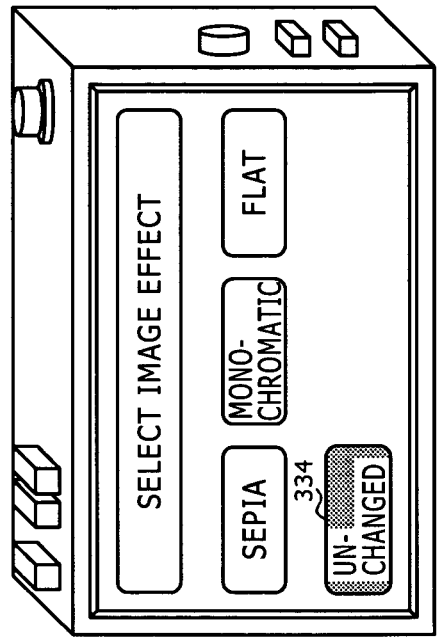
Figure 6A:
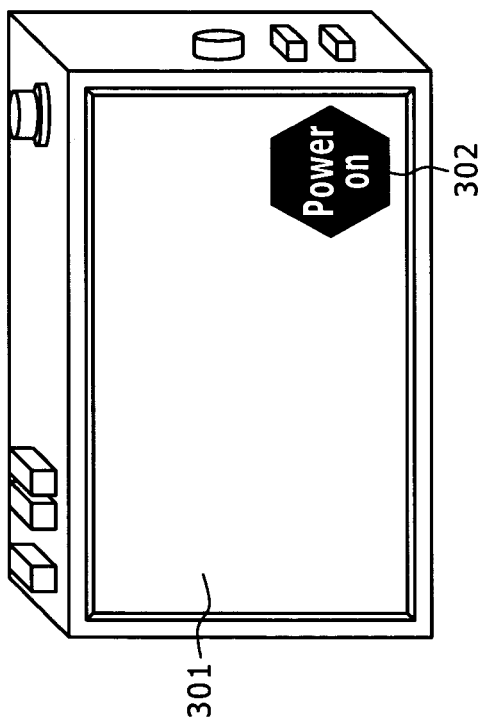

FIG. 6(a) shows the back face of the digital camera in a mode where power to an information input display unit 301 is off. A non-volatile display unit requiring no power supply to maintain the information display is adapted to display, on the information input display unit 301, a "Power On" input portion 302 serving as input means or a switch for turning on the power. In the backside of a display area of the input portion 302, there is provided with the information input key, and this information input key is given setting as a power on/off control switch. The display of the "Power On" input portion 302 helps the user to judge if the power is off.

FIG. 6(b) shows the back face of the digital camera in a mode where the turning on of the power of the information input display unit 301 provides the display of an image. For instance, a captured image may be displayed on a prescribed image display area 321 contained in the information input display unit 301. Further, a "Power Off" input portion 322 serving as input means or a switch for switching off the power is displayed on the information input display unit 301. In the backside of the display area of the "Power Off" input portion 322, there is provided with the information input key, and this information input key is given setting as the power on/off control switch. The display of the "Power Off" input portion 322 permits the user to judge if the power is on. Further, a shutter information display portion 323 serving as display information and indicating a shutter position is displayed on the information input display unit 301. The shutter information display portion 323 may be used as an operation guide for the user.

Figure 6C:
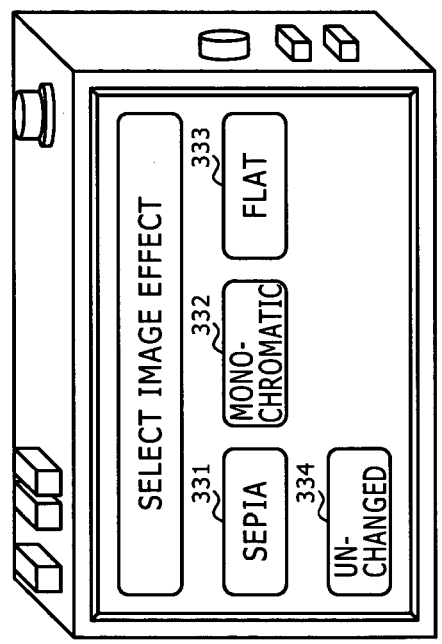

FIG. 6(c) shows the back face of the digital camera in a mode where a menu display is on the information input display unit 301. This menu display is that being equivalent to one example of display previously described with reference to FIG. 3, specifically, provides one information display adapted to permit the user to select one item out of the four choices, "Sepia", "Monochromatic", "Plain" and "Unchanged". In this information display, each display area of four input portions, a "Sepia" input portion 331, a "Monochromatic" input portion 332, a "Plain" input portion 333 and an "Unchanged" input portion 334, is given as the area having the correspondence with the two information input keys, for instance, as previously described with reference to FIG. 3.

When the information input display unit 301 is in the menu display mode, no display of the power on/off control switch is made. This menu display mode is a mode in which switching-off of the power is undesirable, and in this case, no display of the power on/off control switch is made. Further, the information input key at the back of the input portion or the switch for on/off controlling the power as shown in FIGS. 6(a) and (b) is set as the invalid key.

FIG. 6(d) shows one example of display provided in a case where the "Unchanged" input portion 334 are selected and pressed by the user when the information input display unit is in the menu display mode. A change of a display mode such as a display color of the pressed input portion permits the user to visually recognize that user's input is accepted.

Figure 7B:
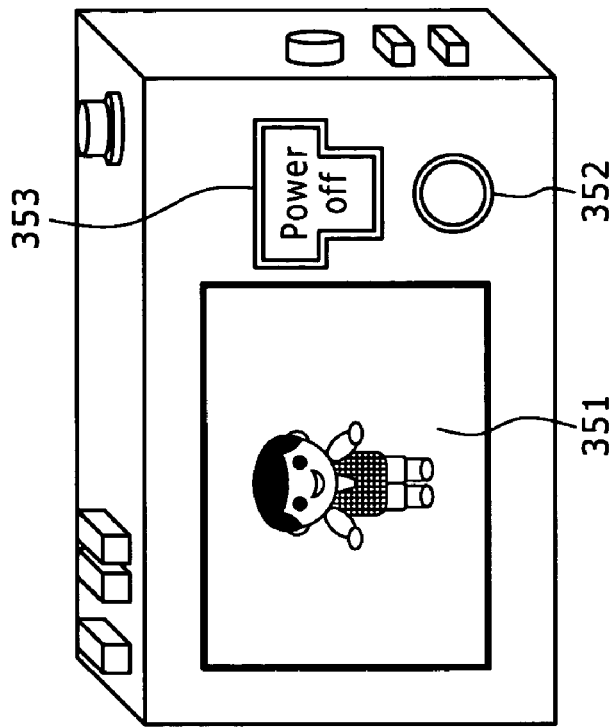
FIG. 7 illustrates another example of display in the case of applying the information input/display apparatus according to one embodiment of the present invention to a digital camera, together with an example of utilizing the another example of display.
Figure 7A:
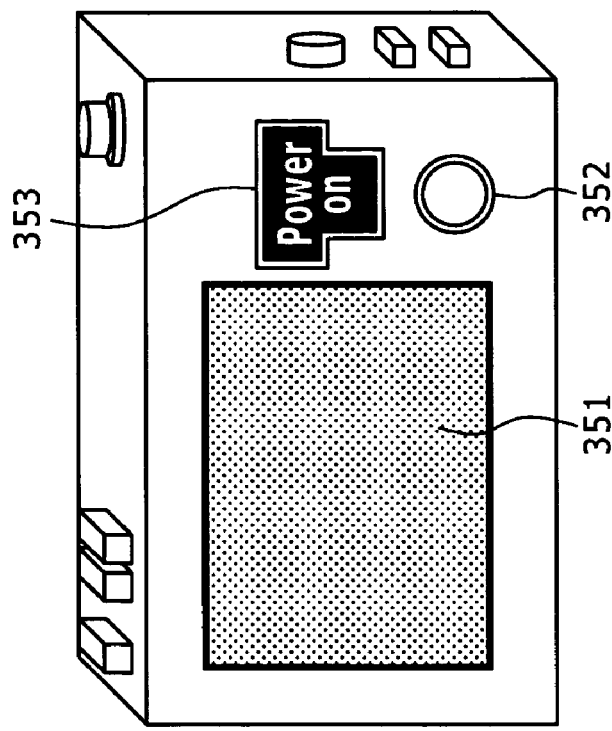

It should be noted that the information input/display apparatus of the present invention is also available in combination with information input keys of related art, with the exception of any one of input functions from the above information input/display apparatus. When the information input/display apparatus is used in combination with the information input keys of related art, an information input key function needs to be displayed at a position that permits the user to recognize the displayed information input key function to be one related to the information input key of related art. FIG. 7 shows one digital camera having a typical display 351 and a fixed-type switch 352, for instance.

The fixed-type switch 352 is a power on/off switch. In the illustrated digital camera, a display unit 353 is set in the neighborhood of the power on/off switch 352 to perform, depending on a switch mode (ON/OFF), non-volatile display requiring no power supply.

Although not shown, it is also possible to provide the non-volatile display by using more than one non-volatile display unit for a plurality of information input keys. In this case, a portion of the display unit corresponding to the plurality of information input keys is caused to make a display in such a way that the user may understand which information input key is displayed. For example, an arrow or the like may point the information input key.

Figure 8:
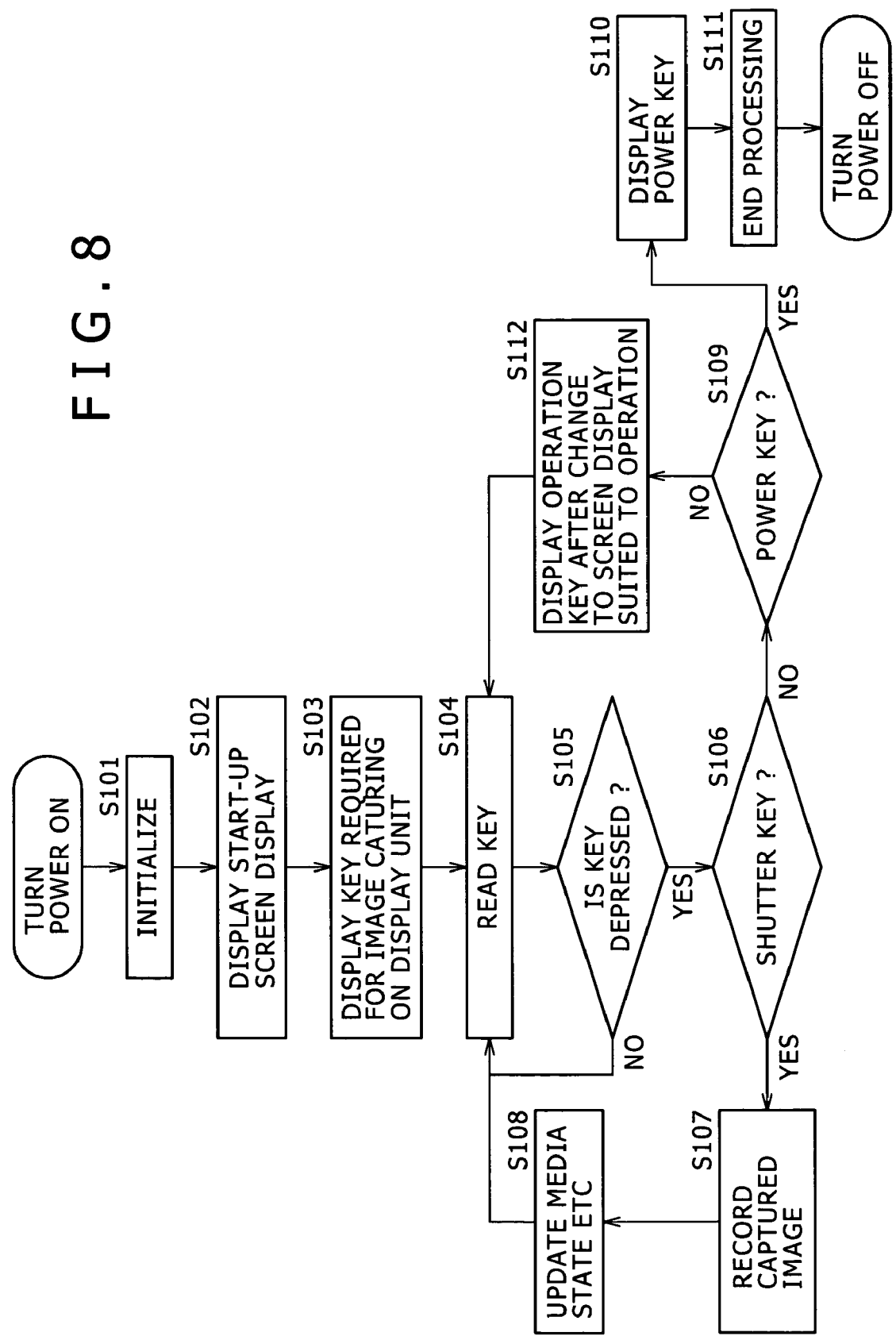
FIG. 8 is a flowchart that describes a processing sequence in the case of applying the information input/display apparatus according to one embodiment of the present invention to a digital camera.

One processing sequence in the case of applying the information input/display apparatus of the present embodiment to the digital camera is described with reference to a flowchart of FIG. 8. First, following the turning on of the power of the apparatus, initialization of the apparatus is performed in Step S101, and is followed by Step 102 for displaying a start-up display by using the display unit of the information input/display apparatus. Further, Step S103 follows to display, on a display, the information input keys to be used for image capturing. In this Step, after the display of the information input key such as a shutter key, the information input key in the position having the correspondence with each displayed input portion is set in accordance with content of each displayed input portion.

In this processing of the present embodiment, the shutter input portion, power input portion and other input portions are assumed to be displayed. Furthermore, the information input key corresponding to the display position of the input portion is set as the information input key suited for the content of the corresponding displayed input portion.

Next, it is judged, in Steps S104 and S105, whether or not input operation is performed through any information input key. When it is determined that none of the information input keys is pressed down, readout of the information input key is executed again (S105 (No)→S104).

Conversely, when it is determined that the information input key is pressed down (S105 (Yes)), a judgment on a type of the pressed information input key takes place on and after Step S106. When it is determined in the Step S106 that the pressed information input key is the shutter key (S106 (Yes)), the processing goes on to Step S107 for recording a captured image, and is followed by Step S108 for performing updating etc. of a media status display.

Conversely, when it is determined in the Step S106 that the pressed information input key is not the shutter key (S106 (No)), the processing goes on to Step S109. When it is determined in the Step S109 that the pressed information input key is not the power key (S109 (No)), the processing goes on to Step S112 for displaying the information input key etc. to be operated after a transition to a display suited to the operation. The menu display etc. previously described with reference to FIG. 3, for instance, is adapted to the processing in the Step S112.

Conversely, when it is determined in the Step S109 that the pressed information input key is the power key (S109 (Yes)), the processing goes on to Step S110 for displaying the power-on information input key, and then the power is switched off through the end processing of the apparatus in Step S111.

Figure 9:
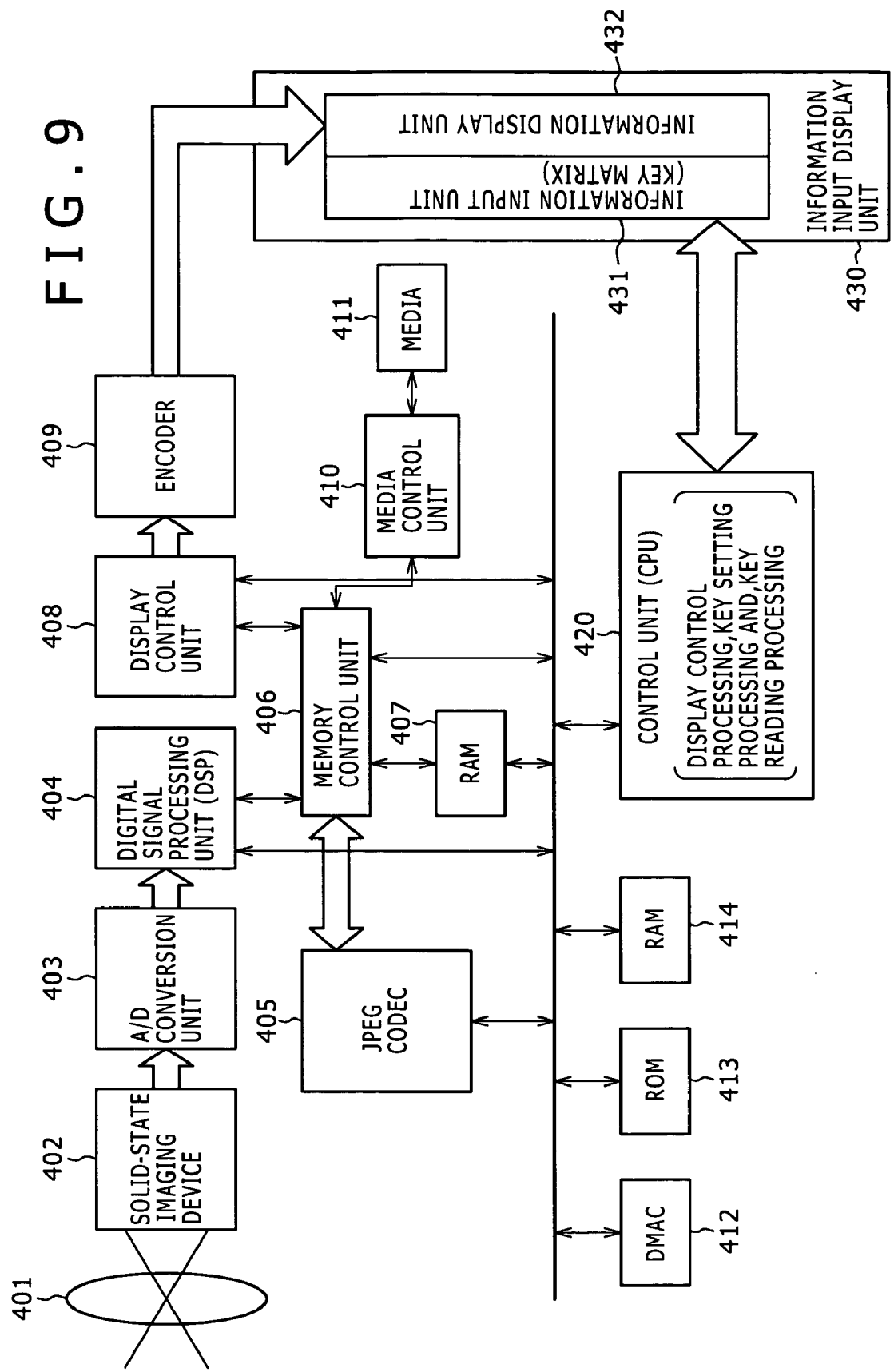
FIG. 9 is a block diagram showing one hardware configuration in the case of applying the information input/display apparatus according to one embodiment of the present invention to a digital camera.

Next, one hardware configuration of a digital camera having the information input/display apparatus of the present embodiment is described with reference to FIG. 9. As shown in FIG. 9, an image capturing apparatus includes an information input display unit 430 having information input and information display functions, in addition to a lens 401, a solid-state imaging device or a CCD 402, an A/D conversion unit 403, a digital signal processing unit 404, a JPEG codec 405, a memory control unit 406, a RAM 407, a display control unit 408, an encoder 409, a media control unit 410, a media 411, a DMAC (Direct Memory Access Controller) 412, a ROM 413, a RAM 414, and a control unit or a CPU 420. The information input display unit 430 has an information input unit 431 having a key matrix configuration, and an information display unit 432.

The digital signal processing unit 404 has a signal processor, and this signal processor is adapted to perform preliminarily programmed image processing after acquiring, through the memory control unit 406, image data contained in the image RAM 407.

The control unit or the CPU 420 performs control of each processing block, and is further adapted to perform processing such as control of the display information on the information display unit 432 contained in the information input display unit 430, control of the information input key setting for the information input unit 431, and information input or key reading based on the operation of the information input keys. When the key operation of the information input unit 431 is performed, a transmission of a signal to the control unit or the CPU 420 is caused, permitting the pressed information input key to be recognized for determination of the input information according to the prescribed program. Further, the control unit or the CPU 420 also controls the information display unit 432 to update the display information.

One operation at the time of performing image capturing processing is described. The control unit or the CPU 420 starts the image capturing processing, for example, if the shutter key is detected to be pressed down during a period where the input portion corresponding to the shutter key is displayed on the information display unit 432. The pressed shutter key may be detected by detecting the pressing-down of the information input key at the position corresponding to the display position of the shutter key's input portion.

One sequence of the image capturing processing is described. Incident light having reached the solid-state imaging device or the CCD 402 firstly comes to each light-detecting device on an imaging plane, and is then given photoelectric conversion into a electric signal by the light detecting device. Then, this electric signal is further converted, by the A/D conversion unit 403, into a digital signal, which is then given digital signal processing by the digital signal processing unit (DSP) 404, and stored in the RAM 407 through the memory control unit 406. Further, the data contained in the RAM 407 is given compressed coding processing by the JPEG codec 405, and recorded on the recording media 411 such as a memory card through the media control unit 410.

It should be noted that after the display control unit 408 provides analog signal conversion to the image data generated in the digital signal processing unit 404, the encoder 409 performs conversion of the analog signal into a video signal, which is then outputted to the information display unit 432 contained in the information input display unit, leading to the display of the video signal as a monitor image. The overall data processing control as described the above is performed by the CPU 420 functioning as the control unit through memory access control of the DMAC 412 and expansion of programs and data processing parameters in storage areas of the ROM 413 and the RAM 414.

The display data on the information display unit 432 contained in the information input display unit 430 is properly updated under control of the control unit or the CPU 420, and with the updating of the display information, the setting of the information input keys contained in the information input unit 431 is also properly updated. The control unit or the CPU 420 is also adapted to perform this updating processing. Specifically, the display processing and the key updating processing both previously described with reference to FIGS. 3 to 6 are supposed to satisfy the above updating processing. Further, the control unit 420 is also adapted to perform the information processing based on the pressed information input key, after detecting the user's operation based on the pressing-down of any information input keys contained in the information input unit 431.

It should be noted that the information input display unit 430 is also available only with the function of the information display unit 432 for application in the example of a unit having the combination with a switch and/or display unit of related art, as previously described with reference to FIG. 7.

Although the above embodiment has been described in relation to one configuration applied to the digital camera, it is to be noted that the information input/display apparatus of the present invention is not limited to the application to the digital camera, and it is also possible to apply this information input/display apparatus to a display apparatus, an image reproducing apparatus, an image recording apparatus, an image transmitting apparatus, an image receiving apparatus, an image capturing apparatus, an audio recording apparatus, an audio reproducing apparatus, an audio receiving apparatus, an audio transmitting apparatus, a remote controller, a robot, a network apparatus, a set-top box, a game machine, a personal computer, a PDA, a mobile terminal, a washing machine, a drying machine, a cooking apparatus, an ATM and a vending machine etc.

While the present invention has been described in detail with reference to the specific embodiments, it will be obvious to those skilled in the art that various modifications and substitutions may be made without departing from the scope of the present invention. In other words, the present invention has been disclosed in illustrated forms, and should be construed illustrative and not in a limiting sense. Thus, the scope of the present invention is to be judged in also consideration of appended claims.

Further, a hardware or software configuration or a composite configuration including both of the hardware and the software configurations is adaptable to perform a series of processing previously described in the present specification. When performing the processing with the software, it is possible to run the program containing the processing sequence after installing the program into a memory contained in a computer incorporated in a dedicated hardware, or alternatively, installing the program into a general-purpose computer allowing various types of processing to be performed.

The program preliminarily recorded on a hard disc or a ROM (Read Only Memory) serving as a recording medium may be used, for instance. Alternatively, it is also possible to use the program temporarily or permanently stored or recorded in a removable recording medium such as a flexible disc, a CD-ROM (Compact Disc Read Only Memory), a MO (Magneto optical) disc, a DVD (Digital Versatile Disc), a magnetic disc and a semiconductor memory. These types of removable recording mediums may be provided in the example of so-called packaged software, for instance.

It should be noted that the present invention is not limited in the program to installation into the computer through the above types of removable recording mediums, and it is also possible to wireless-transfer the program from a download site to the computer or wired-transfer the program to the computer via a network such as a LAN (Local Area Network) and Internet for the installation of the program into the incorporated recording medium such as the hard disc, after the computer receives the program transferred in this manner.

It is also to be noted that various types of processing having been described in the present specification may be performed not only in time series according to the above described sequence, but also in parallel or individually depending on a processing capability of the apparatus adapted to perform the processing, or at need. Further, the system referred to in the present specification is specified as more than one logical aggregate of apparatuses, and is not limited to a system of a type requiring that the apparatuses in each logical aggregate be installed in the same casing.

The present invention contains subject matter related to Japanese Patent Applications JP 2005-227517 filed in the Japanese Patent Office on Aug. 5, 2005, the entire contents of which being incorporated herein by reference.

What is claimed is:

1. An information input display apparatus comprising:
an information display unit formed with a flexible material;
an information input unit provided at a back of the information display unit, the information input unit including information input keys onto which input of data is performed with a pressing-down process involving a deformation of the information display unit; and
a control unit adapted to perform control processing of display information supplied to the information display unit, the control unit:
determining a mode of operation of the information input display apparatus;
generating display information supplied to the information display unit according to the determined mode of operation;
assigning, to a group of contiguous information input keys, a common processing according to the determined mode of operation, the group of contiguous information input keys corresponding to the generated display information and performing the common processing when selected by the pressing-down process;

setting the group of contiguous information input keys as valid input keys for providing input of information to the apparatus according to the assigned common processing; and setting information input keys not required by the determined mode of operation as invalid input keys, wherein the selection of an invalid key causes no input of information to the apparatus;

wherein the number of contiguous information input keys in the group varies according to the determined mode of operation.

2. The information input display apparatus according to claim 1, wherein the information input unit includes a key matrix including more than one information input key.

3. The information input display apparatus according to claim 1, wherein:

the information display unit is configured to allow display of the display information when there is no power supply to the information input display apparatus; and the control unit is configured to generate display information indicating a power-on switch when there is no power supplied to the information input display apparatus, and assign, to a group of contiguous information input keys, processing for powering on the information input display apparatus when the region corresponding to the power-on switch is depressed.

4. The information input display apparatus according to claim 1, wherein:

the control unit is configured to perform processing for changing a mode of operation if pressing-down of an information input key is detected.

5. The information input display apparatus according to claim 1, wherein:

the information display unit is configured to allow display of the display information when there is no power supplied to the information input display apparatus;

the control unit is configured to generate display information indicating a power-on switch when there is no power supplied to the information input display apparatus, and power on the information input display apparatus when a region corresponding to the power-on switch is depressed; and the control unit is configured to generate display information indicating a power-off switch displayed at the position corresponding to the power-on switch when there is power supplied to the information input display apparatus.

6. An information processing method comprising:

determining a mode of operation of an information input/display apparatus;

generating display information supplied to an information display unit according to the determined mode of operation, the information display unit and an information input unit being stacked on one another forming the information input/display apparatus, the information input unit including information input keys for data input, the information input keys being formed on the back of the information display unit;

assigning, to a group of contiguous information input keys, a common processing according to the determined mode of operation, the group of contiguous information input keys corresponding to the generated display information;

setting the group of contiguous information input keys as valid input keys for providing input of information according to the assigned common processing;

setting information input keys not required by the determined mode of operation as invalid input keys, wherein the selection of an invalid key prevents input of information;

performing operation detection processing for detecting input of information, the input being performed by pressing one of the information input keys to deform the information display unit; and executing the common processing assigned to the group of contiguous information input keys containing the pressed one of the information input keys.

7. The information processing method according to claim 6, wherein the information input unit includes a key matrix including more than one information input key.

8. The information processing method according to claim 6, wherein:

the information display unit is configured to allow display of the display information when there is no power supplied to the information input/display apparatus; and the information processing method further includes:

generating display information indicating a power-on switch when there is no power supplied to the information input/display apparatus; and assigning, to a group of contiguous information input keys, processing for powering on the information input/display apparatus when the region corresponding to the displayed power-on switch is depressed.

9. The information processing method according to claim 6, further comprising:

changing a mode of operation if pressing-down of an information input key is detected.

10. The information processing method according to claim 6, wherein:

the information display unit is configured to allow display of the display information when there is no power supplied to the information input/display apparatus; and the information processing method further includes:

generating display information indicating a power-on switch when there is no power supplied to the information input/display apparatus;

powering on the information display unit when a region corresponding to the power-on switch is depressed; and generating display information indicating a power-off switch displayed at the position of the power-on switch when there is power supplied to the information input/display apparatus.

11. A computer readable storage medium storing a program adapted to perform, on a computer, a method of processing applicable to an information input display unit, the method comprising:

determining a mode of operation of an information input/display apparatus;

generating display information supplied to an information display unit according to the determined mode of operation, the information display unit and an information input unit being stacked on one another forming the information input/display apparatus, the information input unit including information input keys for data input, the information input keys being formed on the back of the information display unit;

assigning, to a group of contiguous information input keys, a common processing according to the determined mode of operation, the group of contiguous information input keys corresponding to the generated display information;

setting the group of contiguous information input keys as valid input keys for providing input of information according to the assigned common processing;

setting information input keys not required by the determined mode of operation as invalid input keys, wherein the selection of an invalid key prevents input of information;

performing operation detection processing for detecting input of information, the input being performed by pressing one of the information input keys to deform the information display unit; and executing the common processing assigned to the group of contiguous information input keys containing the pressed one of the information input keys.

* * * * *